(12) United States Patent
Kadoiri et al.

(10) Patent No.: US 7,120,912 B2
(45) Date of Patent: Oct. 10, 2006

(54) COMPUTER SYSTEM FOR LOAD BALANCE, PROGRAM AND METHOD FOR SETTING PATHS

(75) Inventors: Satoshi Kadoiri, Chigasaki (JP); Hiroshi Morishima, Yokohama (JP); Makoto Aoki, Kawasaki (JP); Isao Nagase, Ebina (JP); Osamu Kohama, Yokohama (JP); Hirofumi Sahara, Yokohama (JP)

(73) Assignees: Hitachi, Ltd., Tokyo (JP); Hitachi Software Engineering Co., Ltd., Tokyo (JP)

( * ) Notice: Subject to any disclaimer, the term of this patent is extended or adjusted under 35 U.S.C. 154(b) by 11 days.

(21) Appl. No.: 10/975,447

(22) Filed: Oct. 29, 2004

(65) Prior Publication Data

US 2006/0026346 A1 Feb. 2, 2006

(30) Foreign Application Priority Data

Jul. 28, 2004 (JP) ............................. 2004-220241

(51) Int. Cl.
*G06F 9/46* (2006.01)
*G06F 11/00* (2006.01)
*G06F 15/16* (2006.01)

(52) U.S. Cl. .......................... 718/104; 714/5; 709/235
(58) Field of Classification Search ................ 718/105, 718/104; 714/5; 709/235
See application file for complete search history.

(56) References Cited

U.S. PATENT DOCUMENTS

| 4,633,387 | A | 12/1986 | Hartung et al. |
| 5,239,649 | A * | 8/1993 | McBride et al. ............ 718/105 |
| 6,434,637 | B1 | 8/2002 | D'Errico |
| 6,542,944 | B1 | 4/2003 | D'Errico |
| 6,640,281 | B1 | 10/2003 | Obara et al. |
| 6,766,359 | B1 | 7/2004 | Oliveira et al. |
| 6,802,021 | B1 | 10/2004 | Cheng et al. |
| 2002/0156887 | A1 | 10/2002 | Hashimoto |
| 2004/0078632 | A1 * | 4/2004 | Infante et al. .................. 714/5 |

(Continued)

FOREIGN PATENT DOCUMENTS

JP    2000-330924    11/2000

(Continued)

OTHER PUBLICATIONS

Jacob Gorm Hansen and Asger Kahl Henriksen, Nomadic operating system, Dec. 10, 2002.*

(Continued)

*Primary Examiner*—Meng-Al T. An
*Assistant Examiner*—Camquy Truong
(74) *Attorney, Agent, or Firm*—Mattingly, Stanger, Malur & Brundidge, P.C.

(57) ABSTRACT

Provided is a high performance storage system, in which a cache memory is effectively used and access loads are balanced. In a computer system including a computer and a storage system coupled with the computer, the storage system includes one or more channel adapters which communicate with the computer, and a plurality of logical units which store data. The computer includes one or more host bus adapters which communicate with the storage system, and a path management module which manages a path along which the computer accesses the logical unit. The path management module includes a load measurement module which measures an access load on each logical unit, and an active path setting module which sets one or more active paths, along which an access from the computer passes, for each of the logical unit based on the measured access load.

14 Claims, 12 Drawing Sheets

U.S. PATENT DOCUMENTS

2005/0108450 A1    5/2005  Sahara et al.
2005/0182849 A1*   8/2005  Chandrayana et al. ...... 709/235

FOREIGN PATENT DOCUMENTS

| | | |
|---|---|---|
| JP | 2002-182978 | 6/2002 |
| JP | 2003-099384 | 4/2003 |
| JP | 2004-185093 | 7/2004 |
| JP | 2004-185327 | 7/2004 |
| JP | 2005-010956 | 1/2005 |

OTHER PUBLICATIONS

Kinshuk Govil, Virtual clusers: Resource Management on Large Shared-Memory Multiprocessors, Oct. 2000.*

Constantine P. Sapuntzakis et al. , Optimizing the migration of Virtual Computer, Feb. 12, 2003.*

Edouard Bugnion et al., Runing Commodity Operating Systems on Scalable Multiprocessors.*

* cited by examiner

PATH TABLE

| PATH NUMBER (301) | FAILURE STATE (302) | ACTTIVE INFORMATION (303) | HBA-ID (304) | CHA-ID (305) | LU-ID (306) | MEASURED LOAD (307) | ACTIVE PATH SET LU NUMBER (308) |
|---|---|---|---|---|---|---|---|
| 1 | No | Yes | 1 | 1 | 1 | 50 | 1 |
| 2 | No | No | 1 | 2 | 1 | 0 | 0 |
| 3 | No | No | 1 | 3 | 1 | 0 | 0 |
| 4 | No | No | 2 | 1 | 1 | 0 | 0 |
| 5 | No | No | 2 | 2 | 1 | 0 | 0 |
| 6 | No | No | 2 | 3 | 1 | 0 | 0 |
| 7 | No | No | 1 | 1 | 2 | 0 | 0 |
| 8 | No | No | 1 | 2 | 2 | 0 | 0 |
| 9 | No | No | 1 | 3 | 2 | 0 | 0 |
| 10 | No | No | 2 | 1 | 2 | 0 | 0 |
| 11 | No | Yes | 2 | 2 | 2 | 20 | 1 |
| 12 | No | No | 2 | 3 | 2 | 0 | 0 |
| 13 | No | No | 1 | 1 | 3 | 0 | 0 |
| 14 | No | No | 1 | 2 | 3 | 0 | 0 |
| 15 | No | Yes | 1 | 3 | 3 | 10 | 1 |
| 16 | No | No | 2 | 1 | 3 | 0 | 0 |
| 17 | No | No | 2 | 2 | 3 | 0 | 0 |
| 18 | No | No | 2 | 3 | 3 | 0 | 0 |
| 19 | No | No | 1 | 1 | 4 | 0 | 0 |
| 20 | No | No | 1 | 2 | 4 | 0 | 0 |
| 21 | No | No | 1 | 3 | 4 | 0 | 0 |
| 22 | No | Yes | 2 | 1 | 4 | 60 | 1 |
| 23 | No | No | 2 | 2 | 4 | 0 | 0 |
| 24 | No | No | 2 | 3 | 4 | 0 | 0 |

FIG. 3

LU TABLE

| LU-ID | MEASURED LOAD | PATH ID OF CURRENT ACTIVE PATH | PATH ID OF NEW ACTIVE PATH |
|---|---|---|---|
| 1 | 50 | 111 | −1 |
| 2 | 20 | 222 | −1 |
| 3 | 10 | 133 | −1 |
| 4 | 60 | 214 | −1 |

HBA TABLE

| HBA-ID | MEASURED LOAD (TOTAL OF OVERALL PATHS) | ALLOCATED LOAD | ACTIVE PATH SET LU NUMBER |
|---|---|---|---|
| 1 | 60 | 0 | 2 |
| 2 | 80 | 0 | 2 |

CHA TABLE

| CHA-ID | MEASURED LOAD (TOTAL OF OVERALL PATHS) | ALLOCATED LOAD | ACTIVE PATH SET LU NUMBER |
|---|---|---|---|
| 1 | 110 | 0 | 2 |
| 2 | 20 | 0 | 1 |
| 3 | 10 | 0 | 1 |

COMPUTER SYSTEM FOR LOAD BALANCE, PROGRAM AND METHOD FOR SETTING PATHS

CLAIM OF PRIORITY

The present application claims priority from Japanese application P2004-220241 filed on Jul. 28, 2004, the content of which is hereby incorporated by reference into this application.

BACKGROUND OF THE INVENTION

This invention relates to an access load distribution for a computer system.

Examples of a background art include, as disclosed in JP 2000-330924 A, a technique in which a plurality of accessible paths are provided between a storage system and a computer, and accesses made by the computer are distributed across those paths, thereby improving a system performance. According to such a technique for a load balance, access (I/O) loads are distributed across the plurality of paths, thereby preventing the performance from decreasing due to accesses concentrated on a specific path. In addition, when a failure occurs in one path, the accesses are allocated to another normal path so as to allow continuous accesses.

An alternative technique is proposed in, for example, JP 2002-182978 A, in which a cache memory mounted to a storage system is used for improving a system performance. Examples of the technique include a cache pre-reading technique in which, in addition to data of a block relating to a read request, data of the subsequent block is also read out and stored in the cache memory, thereby improving an access performance.

BRIEF SUMMARY OF THE INVENTION

Conventional techniques for a load balance are not premised on use of a function using a cache memory of a storage system, such as a data pre-reading function. Therefore, accesses to the same logical unit (LU) are distributed to a plurality of paths that do not allow use of the same cache memory, reducing a cache hit rate. As a result, the function such as a cache pre-reading function is not fully utilized, which leads to a problem in that an increase in performance is suppressed.

According to an embodiment of this invention, there is provided a computer system, including: a computer; and a storage system coupled with the computer, the storage system including: one or more channel adapters which communicate with the computer; and a plurality of logical units which store data, the computer including: one or more host bus adapters which communicate with the storage system; and a path management module which manages a path along which the computer accesses the logical unit, the path management module including: a load measurement module which measures an access load on each logical unit; and an active path setting module which selects one of: one channel adapter and one or more host bus adapters; and one or more channel adapters and one host bus adapter, along which an access from the computer passes, for each of the logical unit based on the measured access load, and sets an active path that passes the selected channel adapter and the selected host bus adapter.

According to this invention, access loads are distributed, whereby a system can be prevented from decreasing in performance due to load concentration. Further, when the same logical unit LU is accessed, the same cache memory can be used, whereby the system improves in performance by pre-reading data and other functions.

BRIEF DESCRIPTION OF THE DRAWINGS

FIG. 3 is an explanatory diagram of a path table according to the embodiment of this invention.

DETAILED DESCRIPTION OF THE PREFERRED EMBODIMENTS

Hereinafter, description will be made of embodiments of this invention with reference to the drawings.

Figure 1:
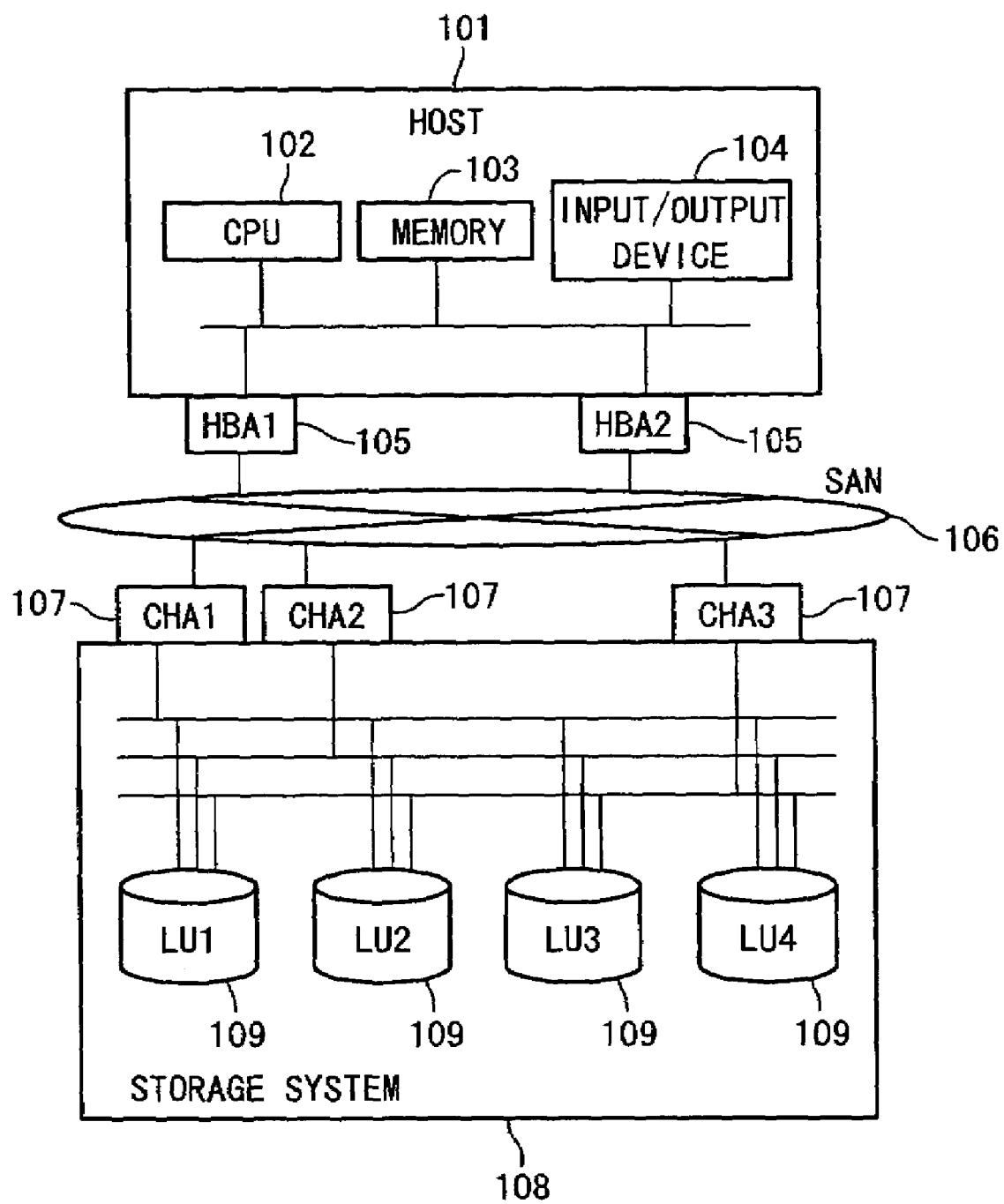
FIG. 1 is a block diagram showing a configuration of a computer system according to an embodiment of this invention.

FIG. 1 is a block diagram showing a configuration of a computer system according to the embodiment of this invention.

The computer system according to this invention includes a host 101, a storage system 108, and a storage area network (SAN) 106 which communicably connects the host 101 and the storage system 108 with each other.

The host 101 is a computer, which writes data to the storage system 108 or reads out data from the storage system 108. The host 101 includes a CPU 102, a memory 103, an input/output device 104, and a host bus adapter (HBA) 105.

The CPU 102 is a processor which executes a program stored in the memory 103.

Figure 2:
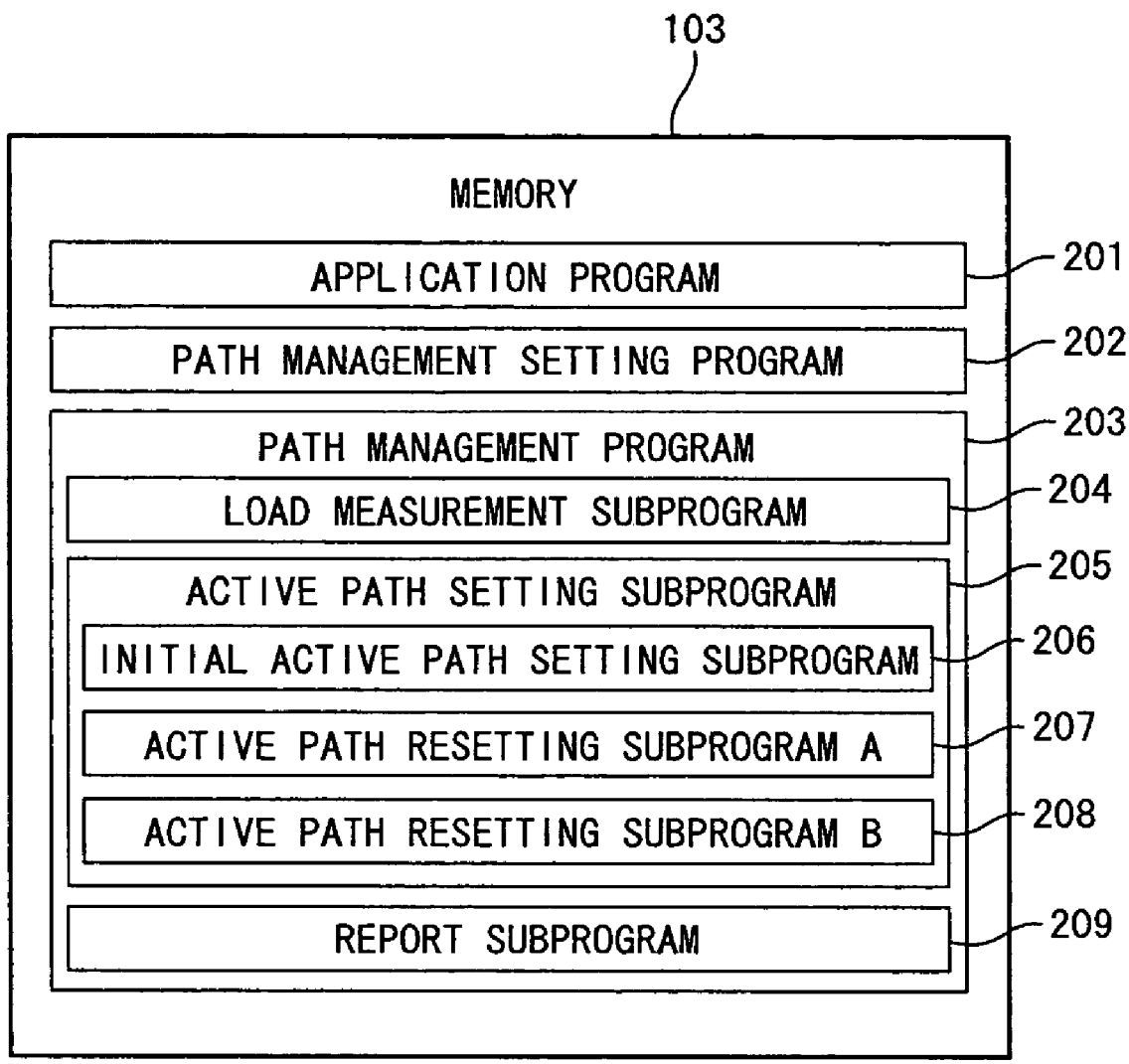
FIG. 2 is an explanatory diagram of programs stored in a memory according to the embodiment of this invention.

The memory 103 is, for example, a semiconductor memory, which stores programs which are shown in FIG. 2 and are to be executed by the CPU 102. The memory 103 further stores tables shown in FIGS. 4 through 7.

The input/output device 104 includes, for example, a display screen and a keyboard (not shown), and may further include other input/output means such as a mouse and a printer.

One or plural HBAs 105 are provided to the host 101, allowing communication with the storage system 108 through the SAN 106. In the example of FIG. 1, two HBAs 105 are provided to the host 101. Here, an HBA 1 and an HBA 2 are the HBAs 105 which have HBA identifiers (HBA-IDs) of "1" and "2", respectively. The host 101 can use either of the HBAs 105 to communicate with the storage system 108.

The storage system 108 is, for example, a disk array system including a plurality of disk drives and a controller which controls the disk drives (not shown). In the storage system 108, one or more logical units (LUs) 109 are set.

The LU 109 is a unit which can be recognized by the host 101 as a single disk drive. The LU 109 is logically a single disk drive, but may physically be a partial region of a single disk drive or a partial or entire region of a plurality of disk drives. In the example of FIG. 1, four LUs 109 are set in the storage system 108. Here, LUs 1 through 4 are the LUs 109 which have LU identifiers (LU-IDs) of "1" through "4", respectively.

The storage system 108 further includes one or more channel adapters (CHAs) 107. The CHA 107 communicates with the host 101 through the SAN 106. In the example of FIG. 1, three CHAs 107 are provided to the storage system 108. Here, CHAs 1 through 3 are the CHAs 107 which have CHA identifiers (CHA-IDs) of "1" through "3", respectively. The storage system 108 can use any of the CHAs 107 to communicate with the host 101.

The CHA 107 normally includes a cache memory (not shown). When the CHA 107 receives a read request for data from the host 101 and when the data of the read request exists in the cache memory, the CHA 107 does not access the LU 109 and returns the data in the cache memory to the host 101. As a result, an access to the LU 109 (in other words, access to a disk drive forming the LU 109) is omitted, improving an access speed.

A cache memory having the same function may be provided to the HBA 105.

The SAN 106 communicably connects the HBA 105 of the host 101 and the CHA 107 of the storage system 108 with each other. Each HBA 105 can communicate with any of the CHAs 107. Similarly, each CHA 107 can communicate with any of the HBAs 105. The SAN 106 typically includes a Fibre Channel switch and cables.

The term "path" used herein represents a data access route extending from the host 101 to the LU 109. In the example of FIG. 1, there are two HBAs 105 and three CHAs 107, so there exist six paths that extend from the host 101 to one of the LUs 109. The path is identified by a path ID. The path ID is defined based on the identifiers of the HBA 105, the CHA 107, and the LU 109 which exist along the corresponding path (HBA-ID, CHA-ID, and LU-ID, respectively). For example, the path extending through the HBA 1 and the CHA 3 to the LU 2 has a path ID of "132".

FIG. 2 is an explanatory diagram of programs stored in the memory 103 according to the embodiment of this invention.

The memory 103 stores an application program 201, an path management setting program 202, and an path management program 203. The programs are all executed by the CPU 102.

The path management setting program 202 is a program for setting parameters and the like of the path management program 203.

The path management program 203 is a program for realizing a load balance according to this invention. The path management program 203 sets an access path with respect to each LU 109 according to an algorithm described later. A data access (I/O) requested by the application program 201 is made via the access path set by the path management program 203.

The path management program 203 includes a load measurement subprogram 204, an active path setting subprogram 205, and a report subprogram 209.

The report subprogram 209 outputs information on active path settings, information on states of a load on each path, and other such information to the input/output device 104. The report subprogram 209 outputs those pieces of information at least when an active path is reset.

The active path will be described later with reference to FIG. 3.

Further, the active path setting subprogram 205 includes an initial active path setting subprogram 206, an active path resetting subprogram A 207, and an active path resetting subprogram B 208.

Those subprograms will be described in detail later.

FIG. 3 is an explanatory diagram of a path table according to the embodiment of this invention.

A path table 300 is a table stored in the memory 103 and includes information indicating the states of all the paths existing in the computer system of FIG. 1 (in other words, the host 101 and the storage system 108 connected thereto). The path table 300 is created by the initial active path setting subprogram 206 and updated by the load measurement subprogram 204, the active path resetting subprogram A 207, and the active path resetting subprogram B 208.

In the path table 300, a path number 301 represents the number of a path, which is uniquely assigned to every path.

A failure state 302 indicates whether a failure has occurred in the path. When no failures have occurred in the HBA 105, the CHA 107, and the LU 109, which form a path, the failure state 302 has a value of "No". In contrast, when a failure has occurred in either of those components, the failure state 302 has a value of "Yes".

An active information 303 indicates whether the path is set as an active path. When the path is set as an active path, the active information 303 has a value of "Yes". When the path is not set as an active path, the active information 303 has a value of "No".

The term "active path" used herein represents a path along which an access (I/O) is made from the host 101 to the LU 109. An inactive path is a standby path that does not contribute to the data access. For example, FIG. 3 shows that there are six accessible paths whose path numbers 301 are "1" through "6" between the host 101 and the LU 1. However, the host 101 actually accesses the LU 1 via only the active path (in the example of FIG. 3, the path whose path number 301 is "1").

The active path is first created by the initial active path setting subprogram 206. After that, as the need arises (for example, when a failure occurs in the active path, or when loads are concentrated on a specific component), the active path resetting subprogram A 207 or the active path resetting subprogram B 208 sets (resets) one of standby paths as a new active path, and further sets the original active path as a standby path. Setting and resetting processes for an active path will be described in detail later.

An HBA-ID 304 represents the identifier (HBA-ID) of the HBA 105 existing along the path.

A CHA-ID 305 represents the identifier (CHA-ID) of the CHA 107 existing along the path.

An LU-ID 306 represents the identifier (LU-ID) of the LU 109 existing along the path.

Figure 10:
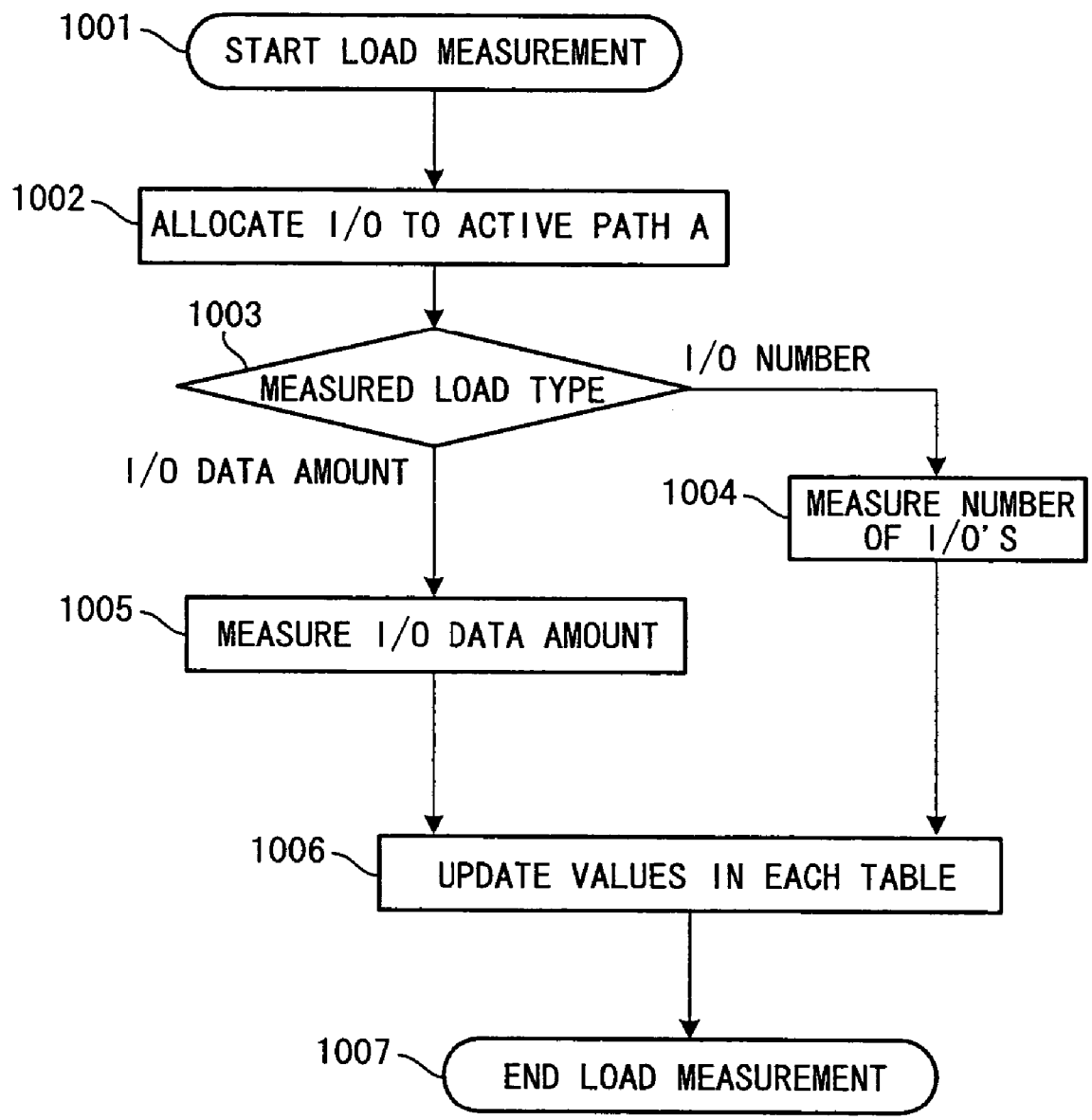
FIG. 10 is a flowchart of a load measurement subprogram according to the embodiment of this invention.

A measured load 307 indicates an amount of load which is actually measured for each path. The amount of load is represented by the number of accesses (I/Os) or the amount of access data per predetermined time period, which is measured by the load measurement subprogram 204 as shown in FIG. 10.

An active path set LU number 308 indicates the number of LUs for which the path is set as an active path. The active path set LU number 308 of the path whose active information 303 is "Yes" is "1", and the active path set LU number 308 of the path whose active information 303 is "No" is "0".

A setting process for the path table 300 will be described in detail later.

Figure 4:
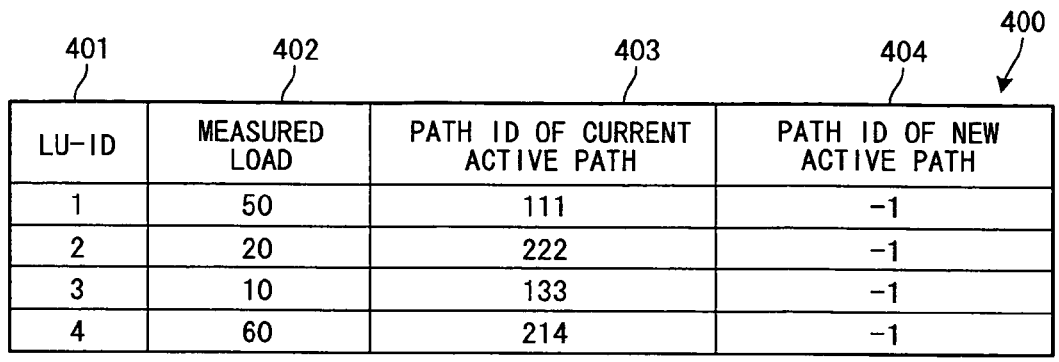
FIG. 4 is an explanatory diagram of an LU table according to the embodiment of this invention.

FIG. 4 is an explanatory diagram of an LU table according to the embodiment of this invention.

An LU table 400 is a table stored in the memory 103 and includes information indicating the states of all the LUs 109 existing in the storage system 108 connected to the host 101 of FIG. 1. The LU table 400 is created by the initial active path setting subprogram 206 and updated by the load measurement subprogram 204, the active path resetting subprogram A 207, and the active path resetting subprogram B 208.

In the LU table 400, an LU-ID 401 represents the LU-ID identifiing each LU. In the example of FIG. 4, a value of the LU-ID 401 varies from "1" through "4".

A measured load 402 indicates an amount of load which is actually measured for each LU. A value of the measured load 402 on each LU is obtained by summing up the values of the measured load 307 of the path table 300 in terms of the corresponding LU-ID 306. For example, the measured load 402 on the LU 109 whose LU-ID 401 is "1" (in other words, LU 1) is represented by the total value of the measured load 307 on the paths whose LU-ID 306 is "1" in the path table 300. In the example of FIGS. 3 and 4, the measured load 402 on the LU 1 is "50".

A path ID of current active path 403 indicates the path ID of a path that is currently set as an active path for each LU. In other words, the path ID of current active path 403 corresponds to the path ID of the path whose active path set LU number 308 is "1" in the path table 300.

A path ID of new active path 404 indicates the path ID of a path that is to be subsequently set as an active path for each LU. When the path that is to be subsequently set as an active path is undecided, the path ID of new active path 404 has a value of "−1".

A setting process for the LU table 400 will be described in detail later.

Figure 5:
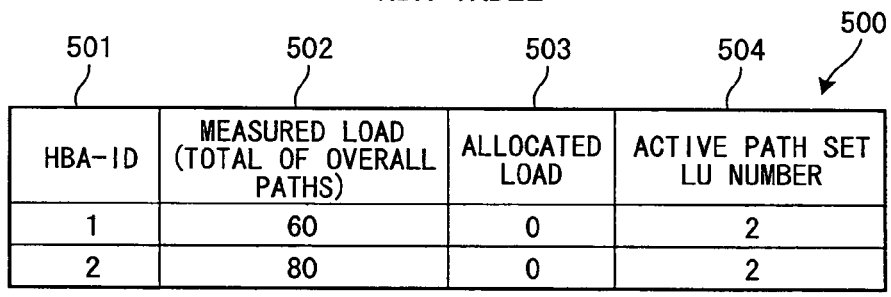
FIG. 5 is an explanatory diagram of an HBA table according to the embodiment of this invention.

FIG. 5 is an explanatory diagram of an HBA table according to the embodiment of this invention.

An HBA table 500 is a table stored in the memory 103 and includes information indicating the states of all the HBAs 105 existing in the host 101 of FIG. 1. The HBA table 500 is created by the initial active path setting subprogram 206 and updated by the load measurement subprogram 204, the active path resetting subprogram A 207, and the active path resetting subprogram B 208.

In the HBA table 500, an HBA-ID 501 represents the HBA-ID identifying each HBA. In the example of FIG. 5, a value of the HBA-ID 501 varies between "1" and "2".

A measured load 502 indicates an amount of load which is actually measured for each HBA. A value of the measured load 502 on each LU is obtained by summing up the values of the measured load 307 of the path table 300 in terms of the corresponding HBA-ID 304. For example, the measured load 502 on the HBA 105 whose HBA-ID 501 is "1 (in other words, HBA 1) is represented by the total value of the measured load 307 for the paths whose HBA-ID 304 is "1" in the path table 300. In the example of FIGS. 3 and 5, the measured load 502 of the HBA 1 is "60".

The field of an allocated load 503 has a value of loads on active paths that have already been allocated to each HBA 105, which is stored when the active path is reset.

An active path set LU number 504 indicates the number of LUs 109 for which each HBA 105 is set as an active path. The active path set LU number 504 of each HBA 105 is obtained by summing up the values of the active path set LU numbers 308 of the path table 300 in terms of the corresponding HBA-ID 304. For example, the active path set LU number 504 of the HBA 105 whose HBA-ID 501 is "1" (in other words, HBA 1) is represented by the total value of the active path set LU numbers 308 for the paths whose HBA-ID 304 is "1" in the path table 300. In the example of FIGS. 3 and 5, the active path set LU number 504 of the HBA 1 is "2".

A setting process for the HBA table 500 will be described in detail later.

Figure 6:
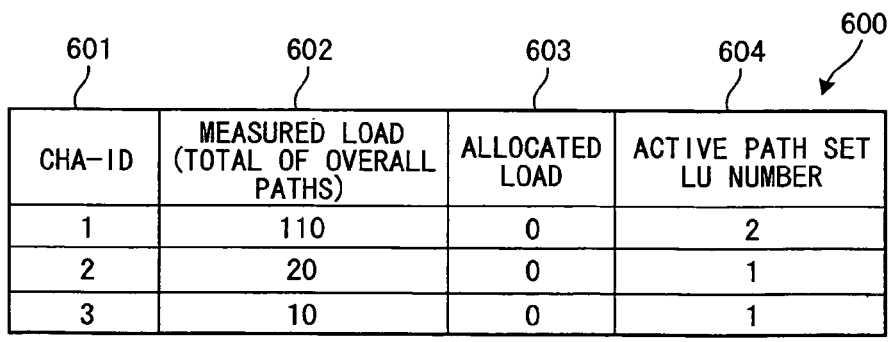
FIG. 6 is an explanatory diagram of a CHA table according to the embodiment of this invention.

FIG. 6 is an explanatory diagram of a CHA table according to the embodiment of this invention.

A CHA table 600 is a table stored in the memory 103 and includes information indicating the states of all the CHAs 107 existing in the storage system 108 connected to the host 101 of FIG. 1. The CHA table 600 is created by the initial active path setting subprogram 206 and updated by the load measurement subprogram 204, the active path resetting subprogram A 207, and the active path resetting subprogram B 208.

In the CHA table 600, a CHA-ID 601 represents the CHA-ID identifying each CHA. In the example of FIG. 6, a value of the CHA-ID 601 varies from "1" through "3".

A measured load 602 indicates an amount of load which is actually measured for each CHA. A value of the measured load 602 on each CHA is obtained by summing up the values of the measured load 307 of the path table 300 in terms of the corresponding CHA-ID 305. For example, the measured load 602 on the CHA 107 whose CHA-ID 601 is "1" (in other words, CHA 1) is represented by the total value of the measured load 307 on the paths whose CHA-ID 305 is "1" in the path table 300. In the example of FIGS. 3 and 6, the measured load 602 of the CHA 1 is "110".

The field of an allocated load 603 has a value of loads on active paths that have already been allocated to each CHA 107, which is stored when the active path is reset.

An active path set LU number 604 indicates the number of LUs 109 for which each CHA 107 is set as an active path. The active path set LU number 604 of each CHA 107 is obtained by summing up the values of the active path set LU numbers 308 of the path table 300 in terms of the corresponding CHA-ID 305. For example, the active path set LU number 604 of the CHA 107 whose CHA-ID 601 is "1" (in other words, CHA 1) is represented by the total value of the active path set LU numbers 308 for the paths whose CHA-ID 305 is "1" in the path table 300. In the example of FIGS. 3 and 6, the active path set LU number 604 of the CHA 1 is "2".

A setting process for the CHA table 600 will be described in detail later.

The LU table 400, the HBA table 500, and the CHA table 600 are created by the following method.

For example, the HBA 105 of the host 101 may detect the LU 109, and the operating system (OS) of the host 101 may obtain information on the detected LU 109 from the HBA 105. The host 101 can obtain information on a path (for example, information indicating which HBA 105 and which CHA 107 exist on the path) by using a SCSI command with respect to the detected LU 109. Based on the information, the host 101 grasps the usable LU 109, HBA 105, and CHA 107, and can create the LU table 400, the HBA table 500, and the CHA table 600. Accordingly, the host 101 can detect the usable LU 109 and CHA 107.

When a plurality of hosts 101 can detect the same LU 109 and CHA 107, those plurality of hosts 101 share the same LU 109 and CHA 107 that have been detected.

In contrast, the LU 109 that cannot be detected by the OS of the host 101 can also be set by a function such as zoning performed by a Fibre Channel switch (not shown) of the SAN 106 or LUN masking performed by the storage system 108. Therefore, the function allows such a setting that the plurality of hosts 101 respectively use different LUs 109.

Figure 7:
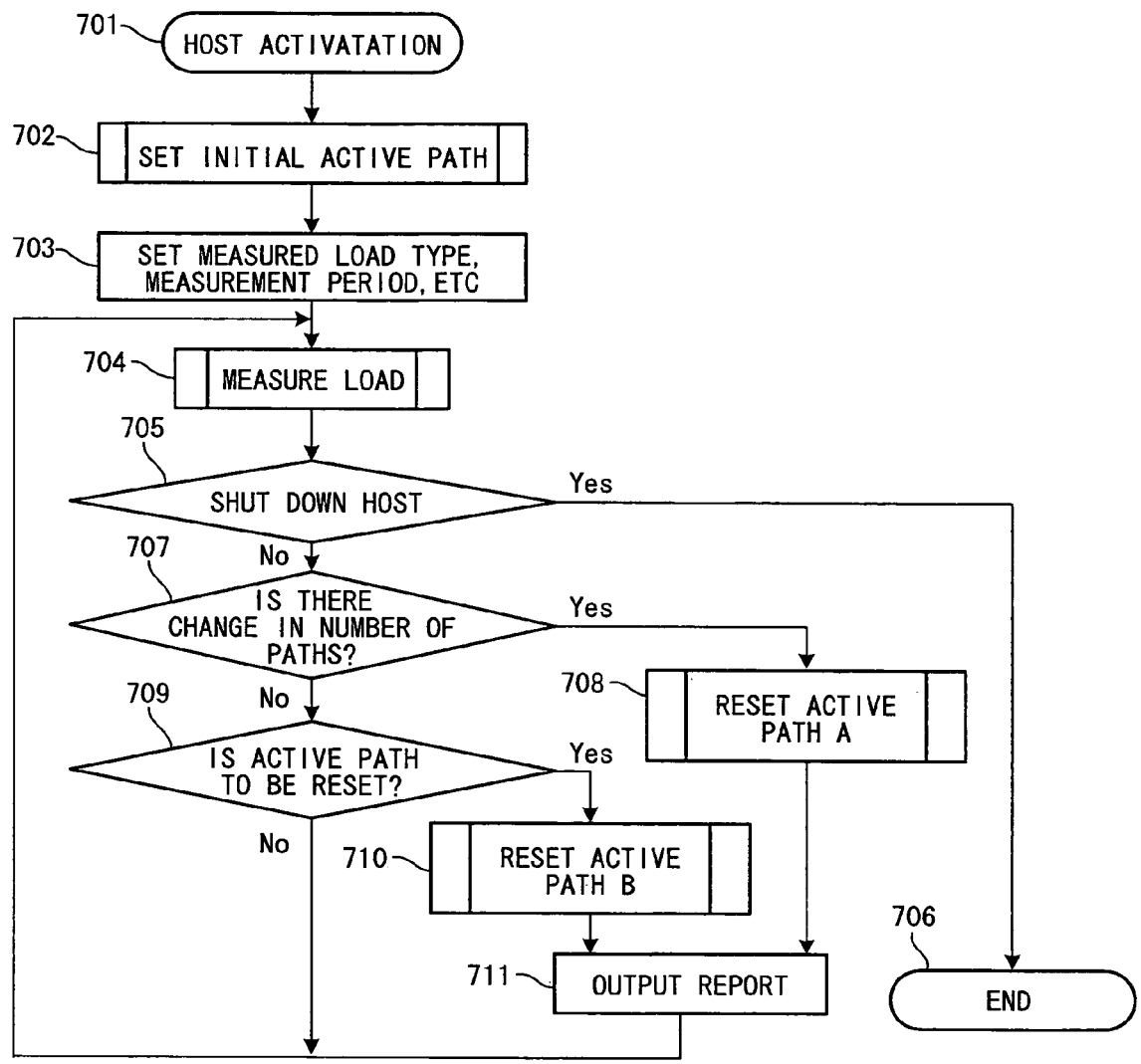
FIG. 7 is a flowchart of an path management program according to the embodiment of this invention.

FIG. 7 is a flowchart of the path management program 203 according to the embodiment of this invention.

Figure 8:
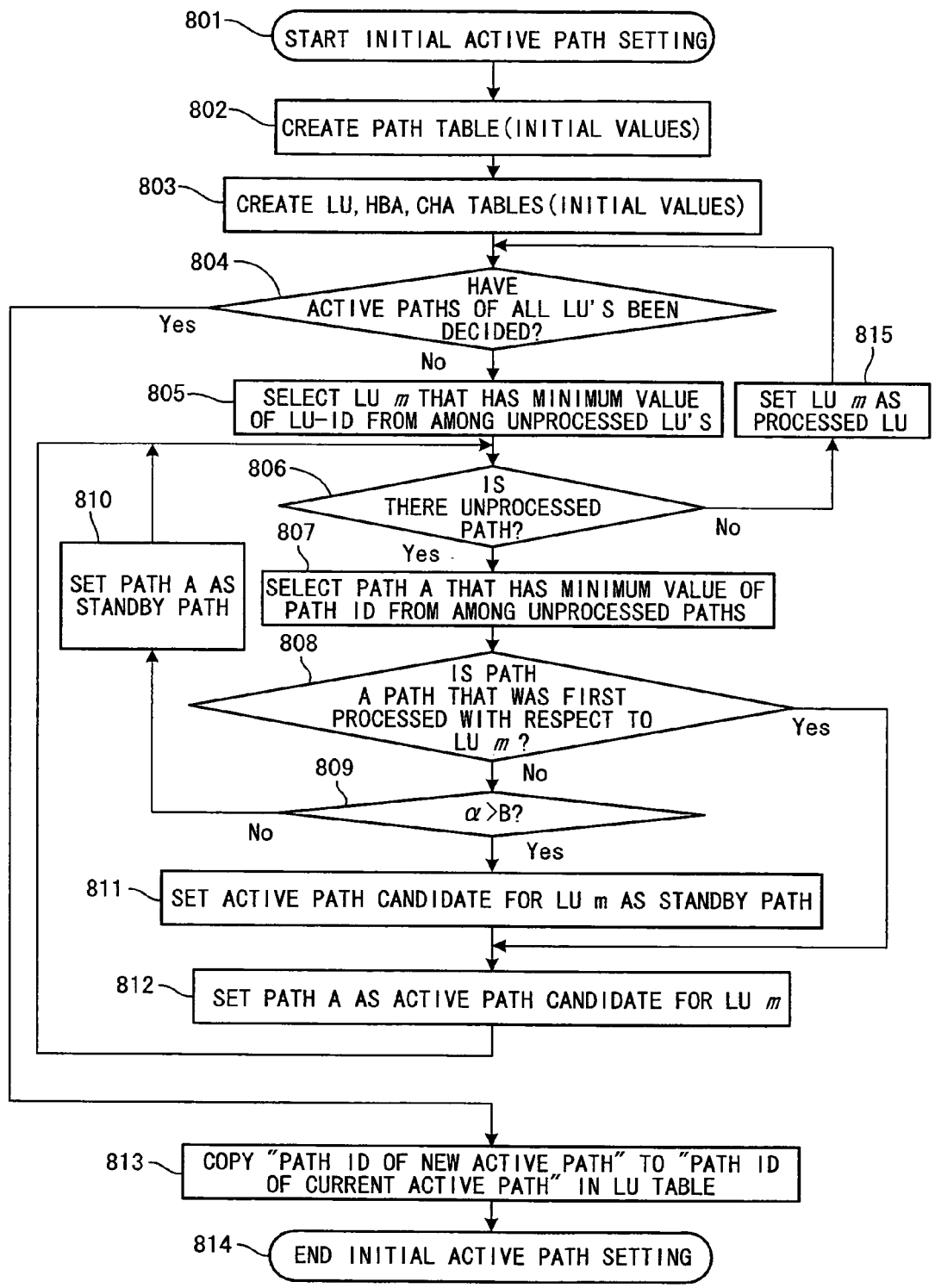
FIG. 8 is a flowchart of an initial active path setting subprogram according to the embodiment of this invention.
Figure 9:
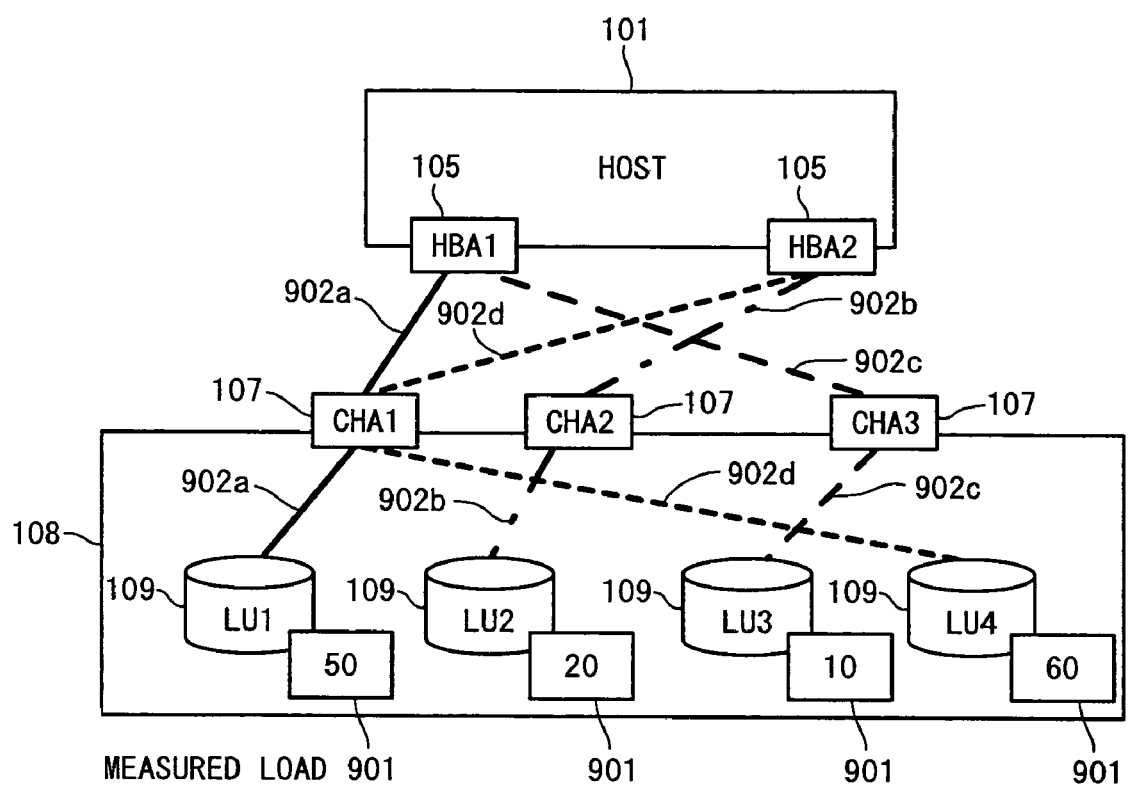
FIG. 9 is a block diagram showing active paths that are set according to the embodiment of this invention.

The host 101 is activated to start execution of the path management program 203 (701), and an initial active path is first set (702). To be specific, as shown in FIGS. 8 and 9, the initial active path setting subprogram 206 called by the path management program 203 sets the initial active path.

Next, a measured load type and a measurement period are set (703). The measured load type represents an object to be measured by the load measurement subprogram 204, and is set by being selected between an "I/O number" and an "I/O data amount" by the user of the host 101. The measurement period represents a period during which the load measurement subprogram 204 measures the object to be measured, and the user of the host 101 sets an arbitrary period as the measurement period. The setting is executed by the path management setting program 202.

Next, the load is measured according to the settings made in the step 703 (704). To be specific, the load measurement subprogram 204 called by the path management program 203 measures the load according to the settings made in the step 703 (see FIG. 10). Every time an I/O (in other words, data access) occurs, the load measurement subprogram 204 measures the load.

Next, it is judged whether the host 101 is to be shut down (705). To be specific, it is judged whether the user has issued a command to shut down the host 101. When it is judged that the host 101 is to be shut down, the path management program 203 ends (706).

On the other hand, when it is judged that the host 101 is not to be shut down, it is then judged whether there is a change in the number of paths (707). Here, the case where there is a change in the number of paths includes: a case where a failure occurs in the HBA 105, CHA 107, or LU 109, disabling the use of one or more paths; a case where a recovery is made from the failure that occurred in the HBA 105, CHA 107, or LU 109; and a case where another HBA 105, CHA 107, or LU 109 is added. When there is a change in the number of paths, the active path is reset (708). To be specific, the active path resetting subprogram A 207 called by the path management program 203 resets the active path (see FIGS. 11 and 12).

On the other hand, when there is no change in the number of paths, it is judged whether the timing for resetting the active path has been reached (709). The user of the host 101 can preset an interval (for example, 1 hour, 1 day, 1 week, 1 month, or 1 year) for resetting an active path. When the user sets "1 hour", it is judged in the step 709 whether or not 1 hour has elapsed since the active path was reset last time (or was initially set). When 1 hour has elapsed, the timing for resetting the active path has been reached, so the active path is reset (710). To be specific, the active path resetting subprogram B 208 called by the path management program 203 resets the active path (see FIGS. 13 to 16).

It should be noted that the resetting of the active path is not only executed at predetermined intervals as described above, but also may be executed in response to a request made by the user of the host 101. In this case, it is judged in the step 709 whether the user has issued an active path resetting request for the active path. When the active path resetting request has been issued, the timing for resetting the active path has been reached, so the procedure advances to the step 710.

On the other hand, when the above-mentioned predetermined interval has not elapsed, and when the active path resetting request has not been issued from the user, the timing for resetting the active path has not been reached yet, so the procedure returns to the step 704.

Meanwhile, after the active path resetting subprogram A 207 or the active path resetting subprogram B 208 is executed, a report is outputted (711). To be specific, the report subprogram 209 displays information on the reset active path on the input/output device 104 of the host 101. After the report is outputted, the procedure returns to the step 704.

FIG. 8 is a flowchart of the initial active path setting subprogram 206 according to the embodiment of this invention.

By being called in the step 702 of FIG. 7, the execution of the initial active path setting subprogram 206 starts (801). At this time, the path management program 203 recognizes all the LUs 109 (in this embodiment, LU 1 to LU 4) that can be accessed by the host 101.

First, the initial active path setting subprogram 206 creates the path table 300 (802). At this time, values in the path table 300 are all initial values. In other words, the values of the failure state 302 and active information 303 are all set to "No", and the values of the measured load 307 and active path set LU number 308 are all set to "0".

Next, the initial active path setting subprogram 206 creates the LU table 400, the HBA table 500, and the CHA table 600 (803). At this time, values in each table are all initial values. In other words, the values of the measured loads 402, 502, and 602, allocated loads 503 and 603, and active path set LU numbers 504 and 604 are all set to "0". The values of the path ID of current active path 403 and path ID of new active path 404 are undecided.

Next, it is judged whether the active paths for all the LUs 109 have been decided (804).

When the active paths for all the LUs 109 have not been decided, the LU 109 (LU m, where "m" represents an LU-ID) that has the minimum value of LU-ID is selected from among unprocessed LUs 109 (805).

Next, it is judged whether there is an unprocessed path among the paths for the LU m (806). When there is no unprocessed path, an active path candidate for the LU m at this time is decided as the active path, so the LU m is set as a processed LU (815). Then, in order to decide the active path for the subsequent LU 109, the procedure returns to the step 804.

Meanwhile, when there is left an unprocessed path, the active path for the LU m is undecided. Thus, in order to decide the active path, a path A that has the minimum value of path ID is selected from among unprocessed paths for the LU m (807).

Next, it is judged whether the path A is the path that was first selected for the LU m (808). When the path A is the path that was first selected, the procedure advances to a step 812 in order to set the path A as the active path candidate for the LU m.

On the other hand, when the path A is not the path that was first selected, in order to judge whether to set the path A as the active path candidate, it is judged whether a value a is larger than a value B (809). The value a used herein represents the total value of the active path set LU number 504 of the HBA 105 on the active path candidate at that time and the active path set LU number 604 of the CHA 107 on the active path candidate at that time. The value B represents the total value of the active path set LU number 504 of the HBA 105 on the path A and the active path set LU number 604 of the CHA 107 on the path A.

As a result, when the value a is not larger than the value B, the path A does not become the active path candidate for the LU m. Thus, the path A is set as the standby path (810), and the procedure returns to the step 806. To be specific, in the step 810, the active information 303 corresponding to the path A in the path table 300 is set to "No".

On the other hand, when the value α is larger than the value B, in order to set the path A as the active path candidate for the LU m, the active path candidate for the LU m at the current time is set as the standby path (811). To be specific, in the path table 300, the active information 303 corresponding to the active path candidate at the current time is set to "No". In addition, in the path table 300, the active path set LU numbers 308 corresponding to the active path candidate at the current time decrements by 1. Further, with regard to the HBA 105 corresponding to the active path candidate at the current time, the active path set LU number 504 in the HBA table 500 decrements by 1. Furthermore, with regard to the CHA 107 corresponding to the active path candidate at the current time, the active path set LU number 604 in the CHA table 600 decrements by 1.

Next, the path A is set as the active path candidate for the LU m (812). To be specific, in the path table 300, the active information 303 corresponding to the path A is set to "Yes". In addition, in the path table 300, the active path set LU numbers 308 corresponding to the path A increments by 1. Further, with regard to the HBA 105 corresponding to the path A, the active path set LU number 504 in the HBA table 500 increments by 1. Furthermore, with regard to the CHA 107 corresponding to the path A, the active path set LU number 604 in the CHA table 600 increments by 1. Moreover, in the LU table 400, the value of the path ID of new active path 404 corresponding to the LU m is set to the value of the path ID of the path A.

After that, the procedure returns to the step 806 to process the subsequent path.

Meanwhile, when the active path for all the LUs 109 is decided in the step 804, in order to put the decided active path into actual operation, the value of the path ID of new active path 404 in the LU table 400 is copied to the path ID of current active path 403 (813). As a result, the path management program 203 starts to operate the new active path. In other words, the path management program 203 allocates the data access (I/O) requested by the application program 201 to the new active path.

After all those processes, the initial active path setting subprogram 206 ends its execution (814).

FIG. 9 is a block diagram showing active paths that are set according to the embodiment of this invention.

FIG. 9 shows an example of results obtained by subjecting the system shown in FIG. 1 to the execution of the initial active path setting subprogram 206 described in FIG. 8.

In FIG. 9, the path IDs of the set active paths are "111", "222", "33", and "214". In other words, an active path 902a extends to the LU 1 via the HBA 1 and the CHA 1. An active path 902b extends to the LU 2 via the HBA 2 and the CHA 2. An active path 902c extends to the LU 3 via the HBA 1 and the CHA 3. An active path 902d extends to the LU 4 via the HBA 2 and the CHA 1.

FIG. 9 shows measured loads 901 indicating an example of the load measured by the load measurement subprogram 204. The measured loads 901 will be described in detail with reference to FIG. 10 and the subsequent figures.

FIG. 10 is a flowchart of the load measurement subprogram 204 according to the embodiment of this invention.

By being called in the step 704 of FIG. 7, the execution of the load measurement subprogram 204 starts (1001).

First, the load measurement subprogram 204 allocates the data access (I/O) from the host 101 to any of the LUs 109, to the active path A set for the LU 109 (1002).

Next, the measured load type is judged (1003). The measured load type is set in the step 703 of FIG. 7.

When it is judged that the "I/O number" is set as the measured load type, the number of data I/Os issued for the active path A is measured (1004).

On the other hand, when it is judged that the "I/O data amount" is set as the measured load type, the data amount of the data I/Os issued for the active path A is measured (1005).

Next, the values in each table are updated (1006). In other words, the value measured in the step 1004 or 1005 is added to the value of the measured load 307 corresponding to the active path A in the path table 300. In addition, in the LU table 400, the HBA table 500, and the CHA table 600, the values measured in the step 1004 or 1005 are added to the values of the measured loads 402, 502, and 602 on the LU, HBA, and CHA, respectively, existing along the active path A.

After all those processes, the load measurement subprogram 204 ends its execution (1007). FIG. 9 shows the measured loads 901 indicating an example of the values measured by the load measurement subprogram 204.

It should be noted that the values in the tables shown in FIGS. 3 to 6 are measured when the measured loads 901 shown in FIG. 9 are measured.

Figure 11:
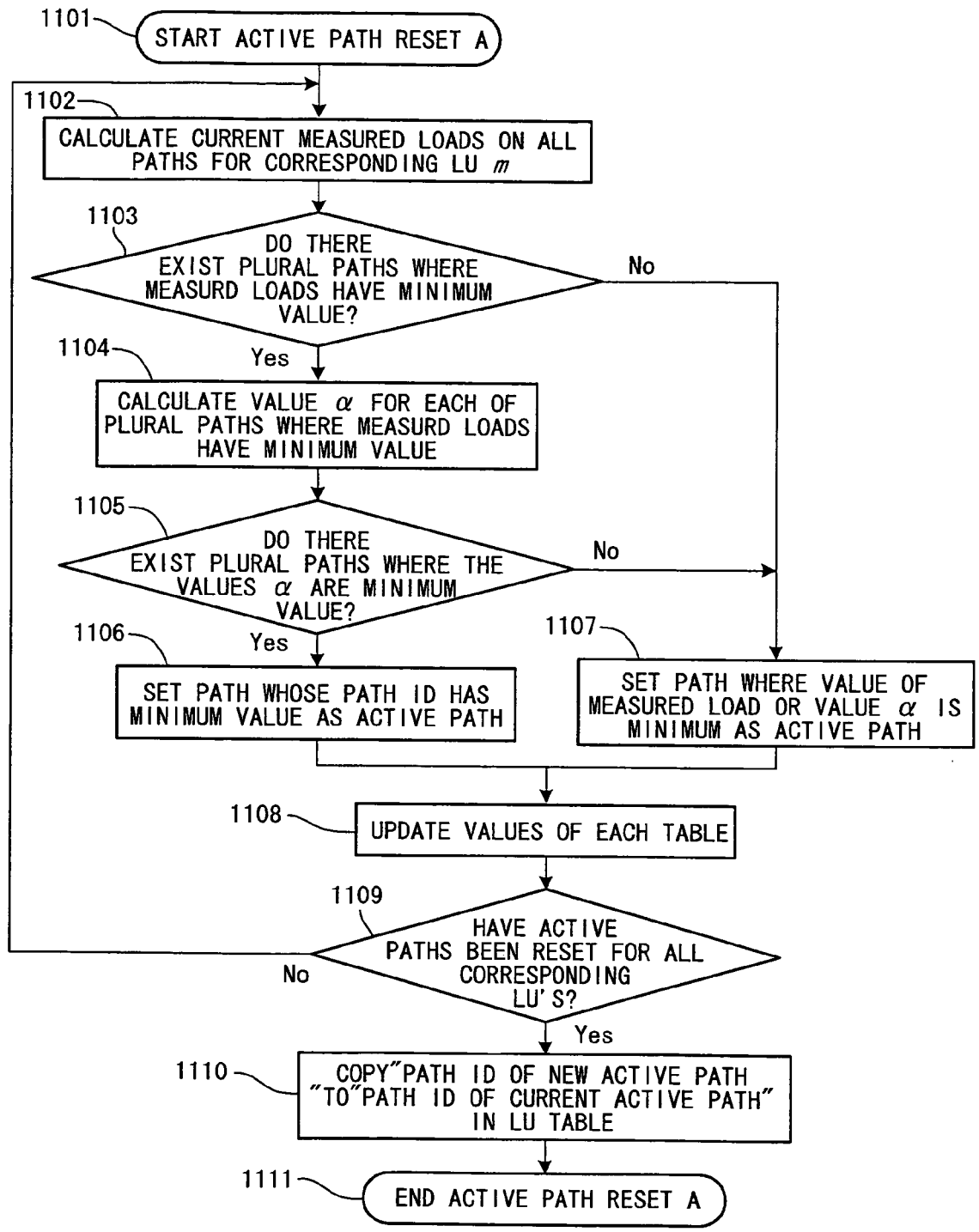
FIG. 11 is a flowchart of an active path resetting subprogram A according to the embodiment of this invention.

FIG. 11 is a flowchart of the active path resetting subprogram A 207 according to the embodiment of this invention.

In the computer system of FIG. 1, in the case where there is a change in the number of paths, the active path resetting subprogram A 207 is called in the step 708 of FIG. 7 to start its execution (1101). Here, the case where there is a change in the number of paths includes: a case where a failure occurs in the HBA 105 or CHA 107 included in the active path; a case where another LU 109 is added; and a case where a recovery is made from the failure that occurred in the HBA 105 or CHA 107.

First, the active path resetting subprogram A 207 according to the embodiment of this invention calculates the measured loads on all the paths extending to the corresponding LU m (1102). When a failure occurs in the active path in the step 1102, the corresponding LU m represents the LU 109 relating to the active path. Alternatively, when another LU 109 is added, the corresponding LU m represents the added LU 109. Alternatively, when a recovery is made from the failure that occurred in the HBA 105 or CHA 107, the corresponding LU m represents the LU 109 that can be accessed via the HBA 105 or CHA 107. Also in the step 1102, the measured loads on all the paths extending to the corresponding LU m is a value obtained by summing up the values of the measured loads 502 and 602 on the HBAs 105 and CHAs 107 included in the active paths on a path basis. However, the value measured for the active path experiencing a failure is not included.

Next, the values of the measured loads calculated in the step 1102 are compared with each other, and it is judged whether there exist a plurality of paths where the measured loads have the minimum value (1103). When there do not exist the plurality of paths where the measured loads have the minimum value, the path where the measured load has the minimum value is set as the active path (1107).

On the other hand, when there exist the plurality of paths where the measured loads calculated in the step 1102 have the minimum value, the value α is calculated for each of the paths (1104). The value α is obtained by summing up the active path set LU numbers 504 and active path set LU numbers 604 in the HBA table 500 and CHA table 600 on a path basis.

Next, the values α calculated for the paths are compared with each other, it is judged whether there exist a plurality of paths where the values α are the minimum value (1105). When there do not exist the plurality of paths where the measured loads are the minimum value, the path where the measured load has the minimum value is set as the active path (1107).

On the other hand, when there exist the plurality of paths where the values α are the minimum value, the path whose path ID has the minimum value is set as the active path (1106).

Next, the values of each table are updated (1108). In other words, in the path table 300, the active information 303 for the path set as the active path is changed into "Yes".

Further, in the LU table 400, the value of the path ID of new active path 404 for the corresponding LU m is changed into the value of the path ID of the path set as the active path.

According to those processes, the active path for the corresponding LU m is reset.

Next, it is judged whether the active paths have been reset for all the corresponding LUs m (1109). As a result, when it is judged that the active paths have not been reset for all the corresponding LUs m (in other words, there exists an LU m for which the active path has not been reset), the procedure returns to the step 1102 to reset the active path for the subsequent LU m.

On the other hand, when it is judged that the active paths have been reset for all the corresponding LUs m, in order to put the reset active path into actual operation, the value of the path ID of new active path 404 in the LU table 400 is copied to the path ID of current active path 403 (1110).

After all those processes, the active path resetting subprogram A 207 ends its execution (1111).

Figure 12:
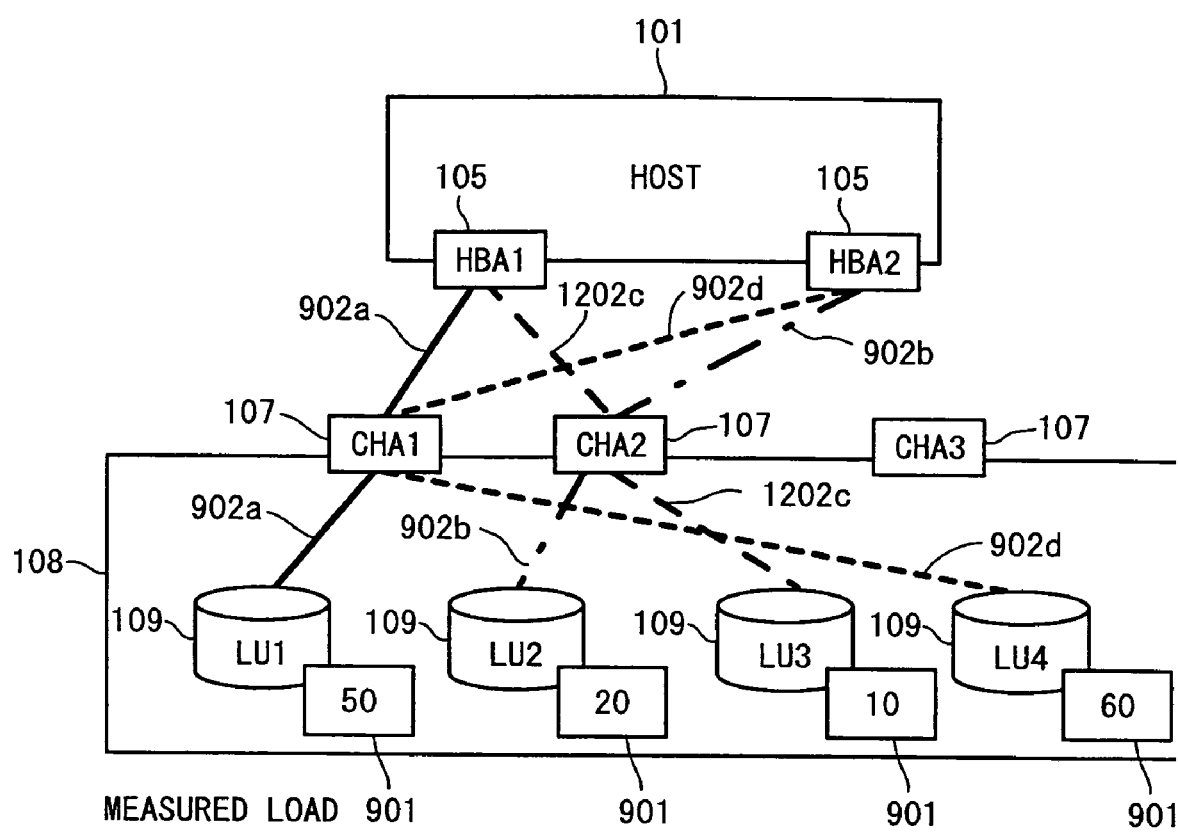
FIG. 12 is a block diagram showing an example of the active paths that are reset according to the embodiment of this invention.

FIG. 12 is a block diagram showing an example of the active paths that are reset according to the embodiment of this invention.

FIG. 12 shows an example of the active paths that are reset by the active path resetting subprogram A 207 described in FIG. 11 when there occurs a failure in the CHA 3 in FIG. 9. In this example, the active path where a failure has occurred is the path extending to the LU 3 via the HBA 1 and the CHA 3, and the measured load on the path has a value of "10".

When there occurs a failure in the CHA 3 in FIG. 9, the "corresponding LUs m" in the step 1102 is the LUs m relating to the active path including the CHA 3, in other words, the LU 3.

Therefore, the current measured loads on all the paths extending to the LU 3 are compared with each other (1102). There are six paths that extends to the LU 3, in which the path numbers shown in the path table 300 are "13" through "18". Among those, the paths (whose path numbers are "15" and "18") relating to the CHA 3 experiencing a failure cannot be used, so the measured loads on the four remaining paths are compared.

The path whose path number is "13" is the path extending to the LU 3 via the HBA 1 and the CHA 1. In the HBA table 500, the measured load on the HBA 1 has a value of "60". Here, the active path where a failure has occurred extends via the HBA 1. Thus, the value of the measured load on the active path where a failure has occurred is subtracted from the value of the measured load on the HBA 1 to obtain a value of "50". On the other hand, in the CHA table 600, the measured load on the CHA 1 has a value of "110". From the above description, the current measured load on the path whose path number is "13" is a total value of "160" obtained by summing up "50" and "110".

Similarly, the current measured loads on the path whose path numbers are "14", "16", and "17" have the values of "70", "190", and "100", respectively. By comparing those values with one another (1102), it is found that the only path where the measured load has the minimum value of "70" is the path whose path number is "14". In other words, there do not exist the plurality paths where the measured loads have the minimum value (1103), so the path whose path number is "14" is set as the active path (1107).

As a result, as shown in FIG. 12, a path 1202c extending via the HBA 1 and the CHA 2 is reset as the active path extending to the LU 3.

Figure 13:
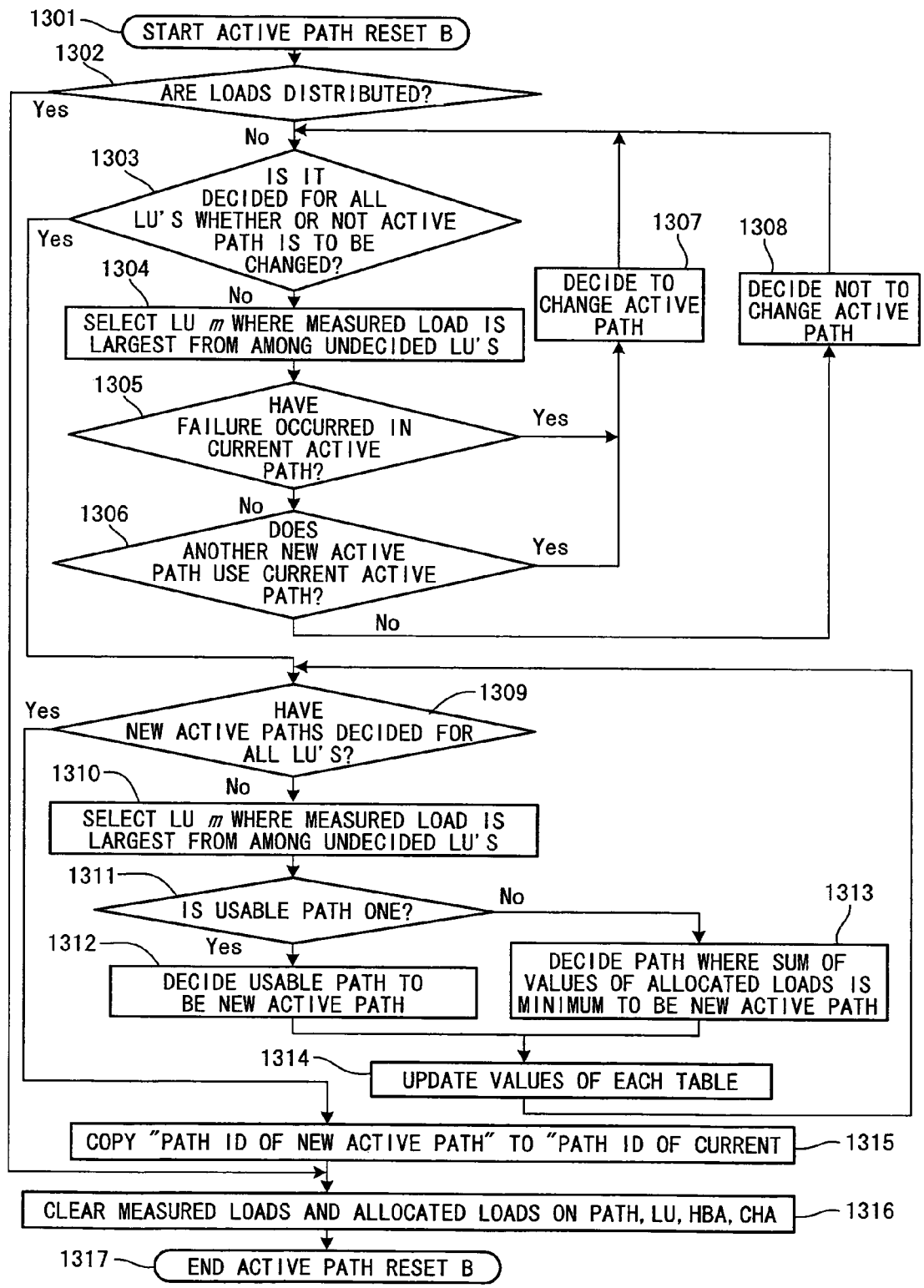
FIG. 13 is a flowchart of an active path resetting subprogram B according to the embodiment of this invention.

FIG. 13 is a flowchart of active path resetting subprogram B according to the embodiment of this invention.

In the computer system of FIG. 1, in the case where the timing for resetting the active path has been reached, the active path resetting subprogram B 208 is called in the step 710 of FIG. 7 to start its execution (1301). Here, the case where the timing for resetting the active path has been reached includes: a case where an active path resetting interval (for example, 1 hour) that is previously set has elapsed; and a case where the user of the host 101 issues the active path resetting request.

First, the active path resetting subprogram B 208 judges whether the loads on the active paths are distributed appropriately. To be specific, the minimum value and the maximum value of the measured loads on all the HBAs 105 and the CHAs 107 are compared with each other to judge whether the minimum value is 90% or more of the maximum value (1302). As a result, when the minimum value is 90% or more of the maximum value, the loads on the active paths are distributed appropriately, so the procedure advances to a step 1316 without resetting the active path.

On the other hand, when the minimum value is not 90% or more of the maximum value, there is imbalance in the loads, so the procedure advances to a step 1303 to distribute the loads by resetting the active path.

In the example of FIG. 13, the "90% of the maximum value among the measured loads" is set as a threshold based on which it is judged whether the loads on the active paths are distributed appropriately. However, the user may set another threshold (for example, 50% of the maximum value).

Next, it is judged whether or not the decision process as to whether the active path is to be changed has ended for all the LUs 109 (1303). When the decision process is judged to have ended, the procedure advances to a step 1309 to decide the active path for the LU 109 for which the active path is to be changed.

On the other hand, the decision process as to whether the active path is to be changed has not ended for all the LUs 109, the procedure advances to a step 1304 to end the process. In other words, the values of the measured loads on the LUs 109 for which it is not decided as to whether the active paths are to be changed are compared with each other, and the LU 109 (LU m, where "m" represents an LU-ID) where the value is largest is selected (1304).

Next, it is judged whether a failure has occurred in the current active path extending to the LU m (1305).

In the step 1305, when it is judged that a failure has not occurred in the current active path extending to the LU m, it is subsequently judged whether the current active path for the LU m is used as the new active path for another LU 109 (1306). To be specific, it is judged whether any of the HBA 105 and the CHA 107 relating to the current active path for the LU m is included in the new active path for another LU 109.

In the step 1306, when it is judged that none of the HBA 105 and the CHA 107 relating to the current active path for the LU m are included in the new active path for another LU 109, it is decided that the active path for the LU m is not to be changed (1308). In other words, the value of the path ID of new active path 404 corresponding to the LU m in the LU table 400 is set to be the same as the path ID of current active path 403. Further, in the HBA table 500 and the CHA table 600, the value of the measured load on the LU m (in other words, the value of the measured load 307 on the active path relating to the LU m in the path table 300) is added to the values of the allocated loads 503 and 603 corresponding to the LU m. Furthermore, in the HBA table 500 and the CHA table 600, "1" is added to the values of the active path set LU numbers 504 and 604 corresponding to the LU m. After that, the procedure returns to the step 1303.

On the other hand, in the step 1305, when it is judged that a failure has occurred in the current active path extending to the LU m, and when it is judged in the step 1306 that any of the HBA 105 and the CHA 107 relating to the current active path for the LU m are included in the new active path for another LU 109, it is decided that the active path for the LU m is to be changed (1307), and the procedure returns to the step 1303.

In the step 1303, when it is judged that the decision process as to whether the active path is to be changed has ended for all the LUs 109, it is judged whether the new active path has been decided for all the LUs 109 (1309). When it is judged that the new active path has been decided for all the LUs 109, the procedure advances to a step 1315.

On the other hand, when it is judged that the new active path has not been decided for all the LUs 109, the values of the measured loads on the LUs 109 for which new active paths are not decided are compared with each other, and the LU 109 (LU m) where the value is largest is selected (1310).

Next, it is judged whether there exist a plurality of paths that are usable (in other words, where no failure has occurred) for the LU m (1311).

When there exists only one path that is usable, the path is decided to be the new active path (1312).

On the other hand, when there exist the plurality of paths that are usable, in the HBA table 500 and the CHA table 600, the values of the allocated loads 503 and 603 corresponding to the LU m are referenced to decide the path where the sum of those values is minimum to the new active path (1313).

Next, the values of each table are updated (1314). In other words, with regard to the HBA 105 and CHA 107 relating to the new active path decided in the step 1312 or 1313, the value of the measured load on the LU m is added to the values of the allocated loads 503 and 603 in the HBA table 500 and CHA table 600. Further, "1" is added to the values of the active path set LU numbers 504 and 604. Furthermore, the value of the path ID of new active path 404 corresponding to the LU m in the LU table 400 is changed into the value of the path ID of new active path decided in the step 1312 or 1313. After that, the procedure returns to the step 1309.

In the step 1309, when it is judged that the new active path has been decided for all the LUs 109, the value of the path ID of new active path 404 in the LU table 400 is copied to the path ID of current active path 403 (1315). As a result, the new active path is put into actual operation.

Next, the values of the measured loads 307, 402, 502, and 602 are cleared from the path table 300, LU table 400, HBA table 500, and CHA table 600 (1316). In other words, those values are set to "0".

After all those processes, the active path resetting subprogram B 208 ends its execution (1317).

Figure 14:
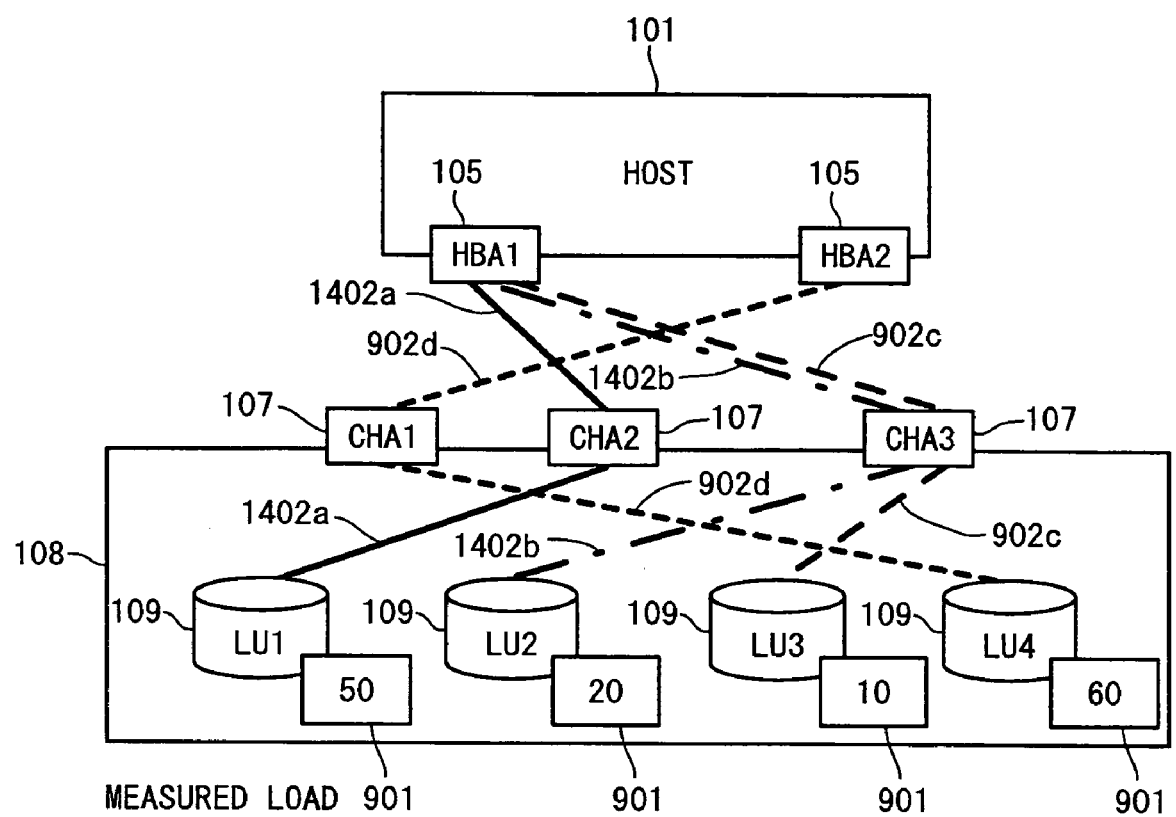
FIG. 14 is a block diagram showing another example of the active paths that are reset according to the embodiment of this invention.

FIG. 14 is a block diagram showing another example of the active paths that are reset according to the embodiment of this invention.

FIG. 14 shows an example of the active paths that are reset by executing in FIG. 9 the active path resetting subprogram B 208 described in FIG. 13. FIGS. 4 to 6, 9, 13, and 14 will be referenced to describe the resetting procedure. It should be noted that when the same operation is repeated by a loop, the description of the repeated operation will be omitted unless it is particularly necessary.

In FIG. 9, when the active path resetting subprogram B 208 starts its execution (1301), it is first judged whether the loads on the active paths are distributed appropriately (1302). For example, in FIG. 6, a value of "99", which is 90% of the maximum value "110" of the measured load 602 on the CHA 107, is much larger than the minimum value "10". This implies that the load distribution is largely unbalanced. Therefore, the procedure advances to the step 1303 to balance the loads by resetting the active paths.

At this time, the decision process as to whether the active path is to be changed has not ended for all the LUs 109 (1303), so the procedure advances to the step 1304.

In the step 1304, the LU 4 where the measured load has the largest value is selected from among the LUs 109 for which it has not been decided whether the active path is to be changed. No failure has occurred in the current active path 902d extending to the LU 4 (1305), so the procedure advances to the step 1306.

Since there is no LUs 109 for which the new active path was decided before the LU 4, any of the HBA 105 and CHA 107 included in the current active path 902d for the LU 4 is not decided for the new active path for another LU 109 (1306). Thus, the procedure advances to the step 1308.

In the step 1308, the current active path. 902d for the LU 4 (path extending to the LU 4 via the HBA 2 and the CHA 1) is decided to be the new active path. At this time, the value of the path ID of new active path for the LU 4 in the LU table 400 is set to "214". Further, the value "60" (measured load on the LU 4) is added to the value "0" (initial value) of the allocated load 503 on the HBA 2 in the HBA table 500 to obtain a value "60". Furthermore, the value "60" (measured load on the LU 4) is added to the value "0" (initial value) of the allocated load 603 on the CHA 1 in the CHA table 600 to obtain a value "60".

Next, the LU 1 where the measured load has the second largest value is selected (1304). The CHA 1 along the current active path 902*a* for the LU 1 (path extending to the LU 1 via the HBA 1 and the CHA 1) has been decided for the new active path for the LU 4 (1306). Therefore, it is decided to change the active path for the LU 1(1307).

It is also decided to change the active path for the LU 2 in the same manner (1307).

Since the current active path 902*c* for the LU 3 (path extending to the LU 3 via the HBA 1 and the CHA 3) do not overlap with the new active path 902*d* for the LU 4 (path extending to the LU 4 via the HBA 2 and the CHA 1) that has been already decided, it is decided not to change the active path (1306 and 1308). At this time, the value of the path ID of new active path for the LU 3 in the LU table 400 is set to "133". Further, the value "10" (measured load on the LU 3) is added to the value "0" (initial value) of the allocated load 503 on the HBA 1 in the HBA table 500 to obtain a value "10". Furthermore, the value "10" (measured load on the LU 3) is added to the value "0" (initial value) of the allocated load 603 on the CHA 3 in the CHA table 600 to obtain a value "10".

Next, the procedure advances to the step 1309.

At this time, since the new active paths for the LU 1 and the LU 2 are undecided, the LU 1 where the measured load has the largest value is selected (1310).

Since there are a plurality of paths that are usable for the LU 1 (1311), the procedure advances to the step 1313.

In the step 1313, the HBA table 500 is first referenced. At this time, the value of the allocated load 503 on the HBA 1 is "10", and the value of the allocated load 503 on the HBA 2 is "60". Thus, the HBA 1 where the allocated load 503 has a smaller value is decided for the new active path for the LU 1.

Next, the CHA table 600 is referenced. At this time, the value of the allocated load 603 on the CHA 1 is "60", the value of the allocated load 603 on the CHA 2 is "0", and the value of the allocated load 603 on the CHA 3 is "10" (initial value). Thus, the CHA 2 where the allocated load has the smallest value is decided for the new active path for the LU 1.

Next, in the step 1314, the value "50" (measured load on the LU 1) is added to the value "10" of the allocated load 503 on the HBA 1 in the HBA table 500 to obtain a value "60". Further, the value "50" (measured load on the LU 1) is added to the value "0" of the allocated load 603 on the CHA 2 in the CHA table 600 to obtain a value "50".

Next, the LU 2 is selected (1310).

In the step 1313, the HBA table 500 is first referenced. At this time, the value of the allocated load 503 on the HBA 1 is "60", and the value of the allocated load 503 on the HBA 2 is "60". Thus, when the values of the allocated loads 503 are the same, either of the HBAs 1 and 2 may be decided for the new active path. In this embodiment, the HBA 1 whose HBA-ID has a smaller value is decided for the new active path for the LU 2.

Next, the CHA table 600 is referenced. At this time, the value of the allocated load 603 on the CHA 1 is "60", the value of the allocated load 603 on the CHA 2 is "50", and the value of the allocated load 603 on the CHA 3 is " 10". Thus, the CHA 3 where the allocated load 603 has the smallest value is decided for the new active path for the LU 2.

Next, in the step 1314, the value "20" (measured load on the LU 2) is added to the value "60" of the allocated load 503 on the HBA 1 in the HBA table 500 to obtain a value "80". Further, the value "20" (measured load on the LU 2) is added to the value "10" of the allocated load 603 on the CHA 3 in the CHA table 600 to obtain a value "30".

As described above, the new active path for each LU 109 is decided. Finally, as shown in FIG. 14, a new active path 1402*a* extending to the LU 1 passes the HBA 1 and the CHA 2. A new active path 1402*b* extending to the LU 2 passes the HBA 1 and the CHA 3. The new active path 902*c* extending to the LU 3 passes the HBA 1 and the CHA 3. The new active path 902*b* extending to the LU 4 passes the HBA 2 and the CHA 1.

At this time, the maximum value of the allocated load 603 on the CHA is "60", and the minimum value thereof is "30". On the other hand, the maximum value of the measured load 602 on the CHA relating to the current active path is "110", and the minimum value thereof is "10". Accordingly, it is understood that the unbalanced loads are alleviated.

According to the above embodiment of this invention, the active paths are set by designating the HBAs 105 and the CHAs 107 so as to balance the loads on the HBAs 105 and the CHAs 107. However, the active paths may be set by designating any one of the HBAs 105 and the CHAs 107 so as to balance the loads on the designated one of the HBAs 105 and the CHAs 107. For example, weighting may allow the user to select which one of the loads on the HBAs 105 or the CHAs 107 is balanced prior to the other.

For example, in the case of setting the active paths by designating only the CHA 107, in the step 809 of FIG. 8, only the values of active path set LU numbers 604 in the CHA table 600 are compared with one another to set the initial active paths. Further, in the steps 1102 and 1103 of FIG. 11, only the measured loads 602 in the CHA table 600 are compared with one another to reset the active paths. Furthermore, in the step 1313 of FIG. 13, only the allocated loads 603 in the CHA table 600 are compared with one another to reset the active paths.

The active path thus set (or reset) designates only the CHA 107 without designating the HBA 105. As a result, for example, when the active path extending to the LU 1 is set for the CHA 1, the host 101 makes an access (I/O) to the LU 1 via an arbitrary HBA 105 and the designated CHA 1. In other words, a plurality of paths that pass the CHA 1 are set as the active paths for the LU 1. In other words, the host 101 always uses the CHA 1 to access the LU 1. On the other hand, the host 101 can use different HBAs 105 on an access (I/O) basis. For example, the host 101 may adopt the conventional load distribution for the HBAs 105.

Even when the active path is thus set, as long as the CHA 107 includes the cache memory, the cache memory is effectively used, thereby improving the performance according to the data pre-reading function or the like.

Similarly, when the HBA 105 includes the cache memory, the active paths may be set by designating only the HBAs 105. As a result, the cache memory of the HBA 105 is effectively used, thereby improving the performance.

According to this invention described above, the active path is set for each of the LUs 109, and the host 101 accesses the LUs 109 via the active paths. The active paths are set so as to balance the access loads from the host 101. As a result, the performance can be prevented from decreasing due to accesses concentrated on a specific path.

Further, after the active paths are set (or reset), and before being reset, the host 101 uses the same path to access one LU 109. In other words, since the active path is not changed for each access, the cache memory of the CHA 107 or the like included in the active path is effectively used. In particular, in sequential accesses, the pre-read data stored in the cache memory is effectively used. As a result, the performance is improved.

Further, when there is an imbalance in the access loads, the active paths are reset so as to resolve the imbalance, thereby maintaining the satisfactory performance at all times.

Further, in the case of resetting the active paths, the resetting is performed from the LU 109 where the load is large in order, thereby distributing the loads appropriately.

What is claimed is:

1. A method in a system comprising a computer having a plurality of host bus adapters (HBAs), a storage system having a first channel adapter (CHA) and a second CHA coupled to a first logical unit in the storage system, and a network coupled to the plurality of HBAs, the first CHA and the second CHA, the method comprising:
   identifying a first HBA of the plurality of HBAs used in a first access path, which is an active path from the computer to the first logical unit via the first CHA;
   selecting a second HBA of the plurality of HBAs which has a second load smaller than a first load of the first HBA;
   changing the active path into a second access path which is from the second HBA to the first logical unit via the first CHA after the second HBA is selected; and
   accessing the first logical unit via the second access path as the active path,
   wherein the first CHA has a cache memory for temporarily storing data to be stored into the logical unit of the storage system or to be sent from the storage system, and
   whereby the computer can continue to use the cache memory in the first CHA after changing the active path from the first access path to the second access path.

2. A method according to claim 1 further comprising:
   calculating and representing the first load by checking a number of input/output commands through the first HBA per second and calculating and representing the second load by checking a number of input/output commands through the second HBA per second.

3. A method according to claim 2,
   wherein the first HBA is identified if an access load for the first logical unit accessed by the first access path including the first HBA is greater than a second access load of a second logical unit which is included in the storage system.

4. A method according to claim 3,
   wherein the access load is calculated and represented based on a number of input/output commands for the first logical unit per second.

5. A method according to claim 3,
   wherein the access load is calculated and represented based on an amount of input/output data for the first logical unit per second.

6. A method according to claim 1 further comprising:
   calculating and representing the first load by checking a number of access paths using the first HBA and calculating and representing the second load by checking a number of access paths using the second HBA.

7. A method according to claim 1 further comprising:
   calculating and representing the first load by checking a data amount of the first HBA per a predetermined time and calculating and representing the second load by checking a data amount of the second HBA per the predetermined time.

8. A system comprising:
   a computer having a first host bus adapter (HBA) and a second HBA; and
   a storage system having a first logical unit, a first channel adapter (CHA) and a second CHA related to the first logical unit, the first CHA and the second CHA being coupled to the first HBA and the second HBA via a network, the first HBA being coupled to the first logical unit by a first access path including the first CHA and by a second access path including the second CHA, and the second HBA being coupled to the first logical unit by a third access path including the first CHA and by a fourth access path including the second CHA,
   wherein the computer selects the first access path as an active path and accesses the first logical unit by using the first access path,
   wherein the computer checks whether or not the second HBA has a second load smaller than a first load of the first HBA, and changes the active path into the third access path if the second HBA has the second load that is smaller than the first load,
   wherein the computer accesses the first logical unit by using the third access path after changing the active path,
   wherein the first CHA has a cache memory for temporarily storing data which is to be stored into the first logical unit in the storage system or be sent from the storage system, and
   whereby the computer can continue to use the cache memory after changing the active path from the first access path to the third access path.

9. A system according to claim 8,
   wherein the computer calculates the first load by checking a number of input/output commands through the first HBA per second and calculating the second load by checking a number of input/output commands through the second HBA per second.

10. A system according to claim 9,
    wherein the storage system has a second logical unit, and
    wherein the computer compares the first load and the second load if an access load for the first logical unit accessed by the first access path including the first HBA is greater than a second access load for the second logical unit.

11. A method according to claim 10,
    wherein the access load is calculated and represented based on a number of input/output commands for the first logical unit per second.

12. A method according to claim 11,
    wherein the access load is calculated and represented based on an amount of input/output data for the first logical unit per second.

13. A method according to claim 8,
    wherein the computer calculates the first load by checking a number of access paths using the first HBA and calculating the second load by checking a number of access paths using the second HBA.

14. A method according to claim 8,
    wherein the computer calculates the first load by checking a data amount of the first HBA per a predetermined time and calculating and representing the second load by checking a data amount of the second HBA per the predetermined time.

* * * * *